United States Patent [19]

Loter

[11] 4,374,152

[45] Feb. 15, 1983

[54] PROCESS FOR PREPARING ACID CHEESE CURD

[75] Inventor: Ira Loter, St. Louis, Mo.

[73] Assignee: Mallinckrodt International Corp., St. Louis, Mo.

[21] Appl. No.: 223,125

[22] Filed: Jan. 7, 1981

Related U.S. Application Data

[63] Continuation of Ser. No. 53,921, Jul. 2, 1979, abandoned.

[51] Int. Cl.$^3$ .................. A23C 19/02; A23C 19/05
[52] U.S. Cl. .................................. 426/39; 426/40; 426/582
[58] Field of Search ............... 426/36, 39, 40, 580, 426/582, 551

[56] References Cited

U.S. PATENT DOCUMENTS

| | | | |
|---|---|---|---|
| 2,982,654 | 5/1961 | Hammond et al. | 426/582 |
| 3,170,795 | 2/1965 | Andre | 426/551 |
| 3,359,116 | 12/1967 | Little | 426/582 X |
| 3,620,768 | 11/1971 | Corbin, Jr. | 426/39 |
| 3,882,250 | 5/1975 | Loter et al. | 426/39 |

*Primary Examiner*—David M. Naff
*Attorney, Agent, or Firm*—Leslie G. Nunn, Jr.; Grace J. Fishel

[57] ABSTRACT

Acid salts such as sodium bisulfate are used as acidifiers for milk, as well as acidogens in the setting of acidified milk, in acid cheese curd manufacture. The use of an acid salt enables acidifying heated milk or heating milk after acidifying without precipitating protein from the milk.

35 Claims, No Drawings

PROCESS FOR PREPARING ACID CHEESE CURD

This is a continuation of application Ser. No. 053,921, filed July 2, 1979, now abandoned.

BACKGROUND OF THE INVENTION

1. Field of the Invention

This invention relates to an improved process for manufacture of acid cheese curd in conventional dairy equipment without using bacterial fermentation.

2. Description of the Prior Art

Various processes for preparing cheese from chemically acidified milk without using bacterial fermentation are known. U.S. Pat. No. 3,620,768 (Corbin) teaches the acidification of cold milk at about 0° C. to about 7.2° C. to a pH of about 5.20 to about 4.88 using a free acid such as lactic acid, phosphoric acid, citric acid, acetic acid, maleic acid, sulfuric acid, hydrochloric acid, succinic acid or the like. British Pat. No. 1,247,415 (Battelle) also teaches the acidification of cold milk, and moreover states at page 3, lines 3 through 7, that: "It is well known that when milk is acidified at a temperature of about 70° F. (21° C.) to a pH of about 5.20 or below, it coagulates almost instantly into a granular water coagulation, totally unfit for making cheese." This disclosure is supported, generally, in "Principles of Dairy Chemistry" by Robert Jenness and Stuart Patton (John Wiley and Sons, New York, 1959) at page 310, where it is stated: ". . . the sensitivity of casein to coagulation by heat is enormously increased by decreasing the pH a few tenths of a unit below the normal value for milk."

U.S. Pat. No. 3,882,250 (Loter et al) teaches the acidification of vigorously agitated milk at about 15° C. to about 30° C. to a pH of about 5.00 by adding 10 to 90 percent aqueous solution of free acid such as lactic acid, phosphoric acid, citric acid, acetic acid, maleic acid, sulfuric acid, hydrochloric acid, succinic acid or the like. An acidogen and proteolytic enzyme are then mixed with the acidified milk of about 15° C. to about 30° C. and the mixture allowed to stand quiescent at the same temperature for about 30 minutes to about 4 hours so as to form an acid cheese curd suitable for making cottage cheese, baker's cheese, quark cheese, cream cheese and Neufchatel cheese.

SUMMARY OF THE INVENTION

Acid salts such as sodium bisulfate, ammonium bisulfate, monosodium phosphate and sodium bitartrate, are useful as acidifiers for milk as well as acidogen in the manufacture of acid cheese curd. Sufficient acid salt is added directly or as an aqueous solution to vigorously agitated milk at temperatures between about 32° F. to about 95° F. to acidify the milk to a pH of from about 5.5 to about 4.8 without coagulation. The acid salt may be added to cold milk at temperatures of from about 32° F. to about 55° F. as well as to warm milk at temperatures of from about 59° F. to about 95° F.

If necessary, the acidified milk temperature is then adjusted to from about 75° F. to about 95° F. and maintained at from about 75° F. to about 95° F. during addition of from about 0 to about 0.8 parts by weight of acidogen with the preferred amount being about 0.2 to about 0.5 parts by weight of acidogen and from about 0.01 parts to about 0.05 parts by weight of proteolytic enzyme per 100 parts by weight of acidified milk. The mixture of acidogen, enzyme and acidified milk is then allowed to remain quiescent at from about 75° F. to about 95° F. for from about 30 minutes to about 4 hours to form an acid cheese curd suitable for making cottage cheese, baker's cheese, quark cheese, cream cheese and Neufchatel cheese. Acid salts are also useful as acidogens in the manufacture of acid cheese curd.

DESCRIPTION OF THE PREFERRED EMBODIMENTS

The fluid milk used in this invention may be a reconstituted powdered milk or fluid milk product such as fresh skim milk, skim milk having about 1–4 percent by weight or more added NFMS (Grade A, Low Heat, non-fat-milk-solids), whole milk, milk-cream mixtures, half milk and half cream, reconstituted condensed milk and the like. The fluid milk may be produced by reconstitution of powdered milk with water or a fluid milk. It is to be understood that fluid milk products may include medium and high butterfat milk or cream having as much as 20 percent butterfat as well as milk having butterfat contents of from about 0.01% to about 5% by weight and a total nonfat solids content of from about 8% to about 16% by weight.

Fluid milk may be acidified with solid acid salt or a 10–90% by weight aqueous solution of an acid salt. Useful acid salts include sodium bisulfate, ammonium bisulfate, monosodium phosphate, monoammonium phosphate, sodium bitartrate or the like. Acidification may be carried out at a temperature of about 32° F. to about 95° F. Acid salt is added to cold milk at a temperature of from about 32° F. to about 55° F. or to warm milk at a temperature of from about 59° F. to about 95° F. The acid salt must be added in such a way that the milk is acidified to the desired pH at the desired temperature without precipitation of casein or any alteration that will prevent cheese curd formation in this process.

A primary factor in successful acidification of milk is the avoidance of casein precipitation (acid coagulation) caused by excessive local acidity. Depending upon the conditions under which the milk is to be processed, various methods of acidification can be used. For example, acidification can be successfully carried out in the laboratory using a small amount of milk under rapid agitation, such as in a blender, with the acid salt such as globular sodium bisulfate being added directly into the milk container in increments. This can be carried on a large scale by using a vibrating feeder to add acid salt particles to introduce into a stream of milk recirculating in a pipe at a uniform rate while constantly reading the milk pH from a meter inserted in the pipeline beyond the point of introduction or in the vat. Alternatively, the acid salt may be added as an aqueous solution. The acid salt solution can be introduced by any conventional metering device or can be drawn into the recirculating pipe using a standard Bernoulli connection, in which case the diameter of the connecting tube will determine the acid salt addition rate.

A change in any acidification variable can be easily compensated for by adjusting other variables. For example, if the milk temperature is at the low end of the range (slightly above 32° F.), a more concentrated acid salt solution can be introduced, or the acid salt addition rate increased, or both of these factors varied. All of these factors may be varied within the limits of this invention up to the point where casein begins to precipitate. Taking another example, if the acid salt or its solution is introduced cold at a 10 percent dilution, then it can be introduced into the milk more rapidly, or it can be introduced at a higher temperature (approaching 95°

F.), or both of these latter factors can be varied as indicated, but to a lesser degree.

The advantage of this invention using an acid salt such as sodium bisulfate instead of phosphoric acid is two fold:

(1) Skim milk acidified with phosphoric acid to pH 4.95 (in-line) at below 55° F. cannot be heated to above 80°–82° F. through a plate heat exchanger with the pH equilibrating to about 5.15, whereas skim milk acidified with sodium bisulfate solution (in-line) below 55° F. can be safely warmed to 90° F. through a plate heat exchanger at an exit pH of 5.00 which equilibrates to 5.10.

(2) Skim milk cannot be acidified with phosphoric acid at 85°–90° F. to below pH 5.45 (in-line) without precipitating protein with the pH equilibrating to 5.55 to 5.60, whereas skim milk at 85°–90° F. can be acidified with sodium bisulfate solution (in-line) to about pH 5.00 without precipitation of protein. The pH equilibrates to 5.20.

By acidifying with sodium bisulfate, one may be adding sodium ions and removing Ca ions as calcium sulfate. Whereas calcium phosphate is soluble at a pH of 5.00, calcium sulfate may be less soluble at this pH thus more effectively sequestering the calcium ions.

The reason for these differences is not known, but according to the literature "salt balance and acidity are generally regarded as two of the most decisive factors in the heat stability of milk".[1] Pyne and McHenry[2] further found that calcium-ion concentration and colloidal phosphate appear to be the chief factors on the tendency of milk to coagulate on heating. The lower the calcium-ion concentration, the more stable was the milk to heat coagulation. Generally, calcium-ion has a greater impact than phosphate-ion on heat stability.[1] "The progressive addition of calcium to milk greatly increases micellar size and sedimentation rate of the casein, and reduces the stability of the milk to heat. This effect is amplified by increasing temperature and pH, and suppressed by calcium complexing anions or increasing alkalinity".[1]

[1]Tumerman, L. and Webb, B. H., "Coagulation of Milk and Protein Denaturation", Chapter 11, "Fundamentals of Dairy Chemistry", Webb and Johnson.
[2]Pyne, G. T. and McHenry, K. A., J. Dairy Res., 22, 60–68 (1955).

In the preparation of sterilized dairy products such as evaporated milk where heat coagulation is a problem, the practice is to adjust the salt balance by adding Na+ ions and removing Ca++ ions. For example, U.S. Pat. No. 3,008,840—Stewart, Jr., et al, Nov. 14, 1961, "Process for Stabilizing Dairy Products Against Age-Thickening", states, "It is not practical to increase the Ca++ or Mg++ ion concentration prior to sterilization since these cations greatly de-stabilize the concentrate in relation to ability of the concentrate to be high-temperature, short-time sterilized without heat coagulation." Further, "in adjusting the salt balance to stabilize against heat coagulation the practice is to add Na+ (e.g., sodium citrate or sodium phosphate) or remove Ca++."

After acidification, the milk may be maintained at about the same temperature or warmed to 75° F. to 95° F. and from about 0.2 to about 0.5 parts by weight of at least one acidogen based on 100 parts by weight of acidified milk, and from about 0.01 to about 0.05 parts by weight of aqueous proteolytic enzyme solution based on 100 parts by weight of acidified milk are added to the milk. The resulting mixture is agitated during and after acidogen and enzyme addition until uniform. The acidified milk is then maintained at about the same temperature while quiescent until the acid liberated from the acidogen and the action of the proteolytic enzyme both bring about coagulation of the milk. It takes from about 30 minutes to about 4 hours after addition of the acidogen and proteolytic enzyme for a cuttable cheese curd to form.

An acidogen such as D-glucono-delta-lactone (GDL), the low melting lactide (m.p. 41°–42° C.) of lactic acid, acetic anhydride, heptonolactone (the lactone of glucoheptonic acid) or the like can be used. Preparation of this low melting lactic acid lactide is described in U.S. Pat. No. 2,982,654—Hammond et al, issued May 2, 1961. If desired, the acid salt may be used as the acidogen. Further, milk can be acidified with a food grade acid and the acidified milk can be set with an acid salt and a proteolytic enzyme.

The proteolytic enzyme can be commercial rennin, rennet, diluted rennet extract, pepsin-rennin mixture, vegetable-derived enzyme clotting agent or the like. Other enzymes such as pepsin, papain and ficin can be used alone or in combination with rennin, the preferred enzyme. Rennin is obtained from the true stomach or abomasum of suckling calves. Rennet, which is a commercial dried extract containing rennin, can also be used. See Merck Index, page 1056 (Merck & Co., Inc.—1976—9th Ed.). Commercial rennet is a solution of the enzyme rennin, stabilized, and with preservatives added and standardized in strength to a certain coagulating or clotting power. Useful commercial aqueous rennin solutions include Hansen's Rennet Extract and Hansen's Cottage Cheese Coagulator available from Hansen's Laboratory, Inc., Milwaukee, Wis. Another useful enzyme is produced by pure culture fermentation of the organism Mucor Miehei. This enzyme is available commercially in units standardized to rennet extract.

The heated, acidified milk containing acidogen and enzyme is then allowed to remain in a quiescent state at from about 75° F. to about 95° F. with the optimum temperature being from about 80° F. to 90° F. for about 30 minutes to about 4 hours to obtain a cuttable cheese curd.

The cheese curd is then cut and cooked. It can be cut into large (¾-inch, ⅝-inch, ½-inch) or small (⅜-inch or ¼-inch) cubes. The cooking rate in the process of this invention is faster than the cooking rate in the cultured process, that is, about 30 minutes to about 90 minutes compared to about 90 minutes to about 150 minutes. Draining and washing of the cooked curd can be carried out using conventional cheesemaking procedures. Processing of whey containing phosphate salts presents environmental problems not encountered with whey containing sulfate salts.

To produce cottage cheese, the acid cheese curd is processed with the additional steps of:
1. cutting the curd into cubes,
2. expressing the whey from the curd,
3. cooking and stirring the curd for from about 30 minutes to about 90 minutes at a temperature of from about 90° F. to about 150° F., and
4. washing and draining the curd.

To prepare baker's cheese, the acid cheese curd is processed with the additional steps of:
1. breaking up the curd,
2. bagging the curd and expressing the whey, and
3. hanging and draining the bagged curd for about 1 hour, to express further whey.

To produce Neufchatel cheese or cream cheese, the acid cheese curd is processed with the additional steps of:
1. cutting the curd,
2. cooking and stirring the curd until the temperature reaches about 130° F. and then continuing cooking for about 15 additional minutes,
3. cooling the curd to about 59° F.,
4. draining the curd overnight at about 37° F.–39° F. to obtain a dry, soft curd,
5. mixing the dry, soft curd with sufficient lactic acid to reduce the curd pH to 4.60, and
6. blending the curd into a smooth homogeneous cheese mass.

The original milk should have about 10.5 to about 11.5% fat content for cream cheese and about 5 to about 6% fat content for Neufchatel cheese.

A variation of this invention involves acidification of 100 parts by weight of vigorously agitated milk at about 32° F. to about 95° F. with a sufficient amount of a mixture of solid acid salt and about 0.0 to about 0.8 parts by weight of a solid acidogen such as glucono-delta-lactone to obtain acidified milk having a pH of from about 4.8 to about 5.5 without coagulation. The milk temperature is then adjusted to about 75° F. to about 95° F. and about 0.01 parts to about 0.05 parts by weight of proteolytic enzyme per 100 parts by weight of acidified milk added. The acidogen, enzyme and acidified milk mixture is then allowed to remain quiescent at about 75° F. to about 95° F. for from about 0.5 to about 4 hours to form an acid cheese curd.

Another variation involves addition at about 75° F. to about 95° F., about 0.1 to about 0.8 parts by weight of acid salt as the acidogen and about 0.01 parts to about 0.05 parts by weight of enzyme to 100 parts by weight of milk previously acidified with food grade free acid to a pH of about 4.8 to about 5.5 without coagulation and allowing the mixture to remain quiescent at this temperature from about 0.5 to about 4 hours to form an acid cheese curd.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, ml, °C., °F. and NFMS are used to indicate grams, milliliters, degrees Centigrade, degrees Fahrenheit and non-fat-milk-solids respectively in these examples.

EXAMPLE I

Reconstituted skim milk (9% solids) at 85° F. was acidified with a 33% aqueous solution of sodium bisulfate by metering the acid in-line into a static in-line mixer so as to have immediate and complete mixing. The in-line pH was maintained at pH 5.04 to 5.08 while collecting 40 gallons of milk. The pH of the milk in the vat had equilibrated to pH 5.20 and had a low viscosity with no precipitation.

To the acidified milk at 85° F. was added a cold water slurry of 635 g glucono-delta-lactone and 47.3 ml rennet coagulator. The milk was stirred for several minutes to assure complete solubilization and uniform dispersion of the lactone and coagulator. The milk was allowed to set in a quiescent state for 78 minutes. The firm coagulum was cut with standard ¼" cottage cheese knives. The pH of the expelled whey was 4.80.

The curd was cooked in the usual manner to 140° F. and then washed three times with water while reducing the temperature for each wash to 90°, 70° and 44° F. The curd was then drained for 30 minutes. The yield of dry curd was 55.0 lbs.

EXAMPLE II 20 gallons reconstituted skim milk at 75° F. was acidified with a solution of 519 g sodium bisulfate monohydrate in 900 ml water. Acid was introduced into the suction side of a centrifugal pump as the milk was recirculated. The acid was added rapidly over 118 seconds. The pH equilibrated to 5.02 with no sign of precipitation.

A slurry of 230 g glucono-delta-lactone and 24 ml cheese coagulator in 600 ml cold water was added and the milk allowed to set 90 minutes. The coagulum was cut with ¼" cheese knives and allowed to "heal" for 15 minutes. The whey pH was 4.87. The whey was acidified with 27 ml 85% phosphoric acid to pH 4.60 and the curd then cooked in the usual manner to 134° F. After washing and draining, a yield of 29.0 lbs was obtained.

EXAMPLE III

This example demonstrates that milk at 88° F. can be safely acidified with sodium bisulfate in-line to pH 5.22 (equilibrated) without precipitation of casein.

Reconstituted skim milk (8.75% solids) at 88° F. was acidified in-line with mixing occurring in a static in-line mixer. A 33% w/w solution of sodium bisulfate was metered in to obtain pH's of 5.3, 5.2, 5.1, 5.0 and 4.90. The milk samples equilibrated to 5.58, 5.40, 5.33, 5.22 and 5.15 respectively. All milk samples were free from precipitation except the last one which contained a very slight precipitate which redissolved on continued agitation.

EXAMPLE IV

This example demonstrates that milk at 85° F. cannot be safely acidified with phosphoric acid in-line to a pH of 5.04 to 5.08 without precipitation of casein.

Reconstituted skim milk (9% solids) at 85° F. was acidified with a 18.75% aqueous solution of phosphoric acid by metering the acid in-line into a static in-line mixer so as to have immediate and complete mixing. The in-line pH was maintained at pH 5.04 to 5.08. The milk precipitated immediately into curds and whey. Under the same conditions, acidification with 33% sodium bisulfate resulted in stable milk which converted to cottage cheese.

EXAMPLE V

This example demonstrates that milk at 85°–86° F. cannot be acidified safely with phosphoric acid below pH 5.55 (equilibrated) without precipitation of casein.

Skim milk at 85°–86° F. was acidified with a solution of 85% H$_3$PO$_4$ diluted with an equal volume of water. The acid was metered in-line through a in-line static mixer to a pH of 5.40 which equilibrated to 5.55. There was no precipitation or increase in viscosity. Attempts to increase acid rate beyond pH 5.40 caused immediate thickening and precipitation.

EXAMPLE VI

This example demonstrates that at 87° F. a sodium bisulfate acid solution can be added rapidly (all at once) to vigorously agitated milk. This was not possible with diluted phosphoric acid.

To one quart reconstituted skim milk (pH 6.58) at 87° F., under vigorous agitation, was added a solution of 5.0 g sodium bisulfate in 10 ml water. Acid solution was poured in quickly. The pH dropped to 5.08 without precipitation. The pH equilibrated to 5.15.

EXAMPLE VII

This example demonstrates that the sodium bisulfate acid solution can be added rapidly to vigorously agitated milk without coagulation of the casein.

To one quart reconstituted skim milk (pH 6.58) at 77° F., under vigorous agitation, was added a solution of 5.25 g sodium bisulfate in 11.5 ml water. Acid solution was poured in quickly. The pH dropped to 4.90 without precipitating. The pH equilibrated to 4.96.

EXAMPLE VIII

One quart skim milk (pH 6.7) at 75° F. was treated with globular sodium bisulfate (Du Pont) in increments. The milk was under constant agitation to insure rapid and complete solubilization of the sodium bisulfate. The following increments were added and the pH noted after 5-10 minutes:

| | | |
|---|---|---|
| 1.5 g | pH 6.01 | |
| 0.5 g | 5.90 | |
| 1.0 g | 5.60 | |
| 2.0 g | 5.12 | No protein precipitation noted. |
| 0.5 g | 4.92 | Very fine ppt. when viewed under 5 power magnification, but disappeared on continued agitation and did not affect cheese quality. |

To this acidified milk was added a slurry of 2.0 g glucono-delta-lactone and 0.6 ml cheese coagulator with stirring to assure complete solubilization of the lactone. The milk was allowed to set undisturbed for 80 minutes at which time a very firm coagulum formed. The pH of the whey after breaking the coagulum was 4.7.

EXAMPLE IX

To one quart vigorously agitated reconstituted skim milk (pH 6.63) at 75° F. was added 5.5 g globular sodium bisulfate:

| | |
|---|---|
| 15 seconds | pH 5.3 |
| 30 seconds | 5.05 |
| 1 minute | 4.95 |
| 2 minutes | 4.99 |
| 3 minutes | 5.00 |
| 4 minutes | 5.01 |
| 5 minutes | 5.01 |

There was no sign of precipitation at any time.

A slurry of 3.2 g glucono-delta-lactone and 0.3 ml cheese coagulator was added and the skim milk allowed to set undisturbed for 80 minutes. A very firm coagulum formed which after breaking had a whey pH of 4.75.

The coagulum was suitable for making cottage cheese.

EXAMPLE X

This example demonstrates the ability to set milk acidified with an acid salt without further addition of acidogens.

To one quart reconstituted skim milk (pH 6.62) at 75° F. was added with vigorous agitation, 6.0 g sodium bisulfate:

| | |
|---|---|
| 15 seconds | pH 5.28 |
| 30 seconds | 5.05 |
| 1 minute | 4.92 |
| 3 minutes | 4.92 |
| 5 minutes | 4.95 no precipitation |

Add an additional 0.5 g sodium bisulfate:

| | |
|---|---|
| 15 seconds | pH 4.80 |
| 30 seconds | 4.80 |
| 1 minute | 4.80 |
| 3 minutes | 4.80 |
| 5 minutes | 4.80 no precipitation |

Add 0.3 ml cheese coagulator and allow to set undisturbed for 90 minutes. A slightly weaker coagulum formed which had a whey pH of 4.81 after breaking.

EXAMPLE XI

To one quart vigorously agitated reconstituted skim milk (pH 6.63) at 75° F. was added a mixture of 5.5 g solid sodium bisulfate and 3.2 g solid glucono-delta-lactone:

| | |
|---|---|
| 15 seconds | pH 5.3 |
| 30 seconds | 5.05 |
| 1 minute | 4.98 |
| 2 minutes | 4.99 |
| 3 minutes | 5.00 |
| 4 minutes | 5.00 |
| 5 minutes | 5.00 |

There was no sign of precipitation at any time.

Add 0.3 ml cheese coagulator and allow to set undisturbed for 80 minutes. A very firm coagulum formed which after breaking had a whey pH of 4.78.

The coagulum was suitable for making cottage cheese.

EXAMPLE XII

To one quart reconstituted skim milk at 74° F. was added a solution of 5.0 g ammonium bisulfate in 10 ml $H_2O$. This acid solution was poured into the vigorously stirred milk. The pH equilibrated to 5.05 without precipitation.

A slurry of 3.4 g glucono-delta-lactone and 0.31 ml cheese coagulator in 10 ml cold water was added. The milk was allowed to set undisturbed for 90 minutes. The firm coagulum was broken and had a whey pH of 4.88.

The coagulum was suitable for making cottage cheese.

EXAMPLE XIII

To one quart reconstituted skim milk at 74° F. was added 75 ml of a 10% sodium bitartrate solution. Additions were made in 5 ml increments. The pH equilibrated to 5.10 without precipitation.

A slurry of 4.0 g glucono-delta-lactone and 0.3 ml cheese coagulator in 10 ml water was added and the milk allowed to set 90 minutes undisturbed. The firm coagulum when broken had a whey pH of 4.85.

The coagulum was suitable for making cottage cheese.

EXAMPLE XIV

To one quart skim milk at 75° F. was added mono sodium phosphate in the following increments:

| | |
|---|---|
| 16.0 g | pH 5.80 |
| 11.0 g | 5.60 |
| 12.0 g | 5.45 |
| 11.0 g | 5.35 |
| 10.0 g | 5.25 |
| 10.0 g | 5.20 |

EXAMPLE XV

This example demonstrates the heat stability of milk acidified with sodium bisulfate.

Skim milk at 40° F. was pumped through a plate heat exchanger using a positive rotary pump. A static in-line mixer was placed between the discharge side of the rotary pump and the inlet of the heat exchanger. Acid was injected in-line at the upstream side of the in-line mixer and the pH was measured at the discharge from the heat exchanger.

A 50% w/w solution of sodium bisulfate was metered into the milk at the static in-line mixer until a steady state pH 5.00 was obtained at 89° F. on discharge from the heat exchanger. The milk was free of precipitation and equilibrated to pH 5.11 in 35 minutes.

EXAMPLE XVI

Following the process of Example XV, skim milk at 35° F. was acidified with a 50% w/w solution of sodium bisulfate to a pH of 5.00 measured at 90° F. at the discharge from the heat exchanger. Fifteen gallons of milk were collected which equilibrated to pH 5.10.

To this milk was added a slurry of 240 g of glucono-delta-lactone and 9.0 ml cheese coagulator in cold water. The milk was stirred for several minutes to allow for complete solution of the GDL. The milk was then allowed to set in a quiescent state for 75 minutes. A firm coagulum formed which had a strength of 21 grams as measured with a Marine Colloids Gel Tester. The coagulum was cut with ¼" cottage cheese knives and the curd allowed to sit for 15 minutes. The whey pH was then 4.61. The curd was cooked-out in the usual manner to 150° F. The curd was washed three times reducing the wash waters to 88° F., 58° F. and 43° F. The curds were then allowed to drain 30 minutes yielding 26.0 lbs.

EXAMPLE XVII

This example demonstrates the instability of milk acidified with phosphoric acid to warming through a plate heat exchanger.

Four quarts skim milk was acidified at 40° F. by the dropwise addition of two 9.5 ml increments of 85% H₃PO₄ diluted with equal volume of water. The pH was 4.90 at 40° F. The milk was then warmed to 82° F. by pumping through a plate heat exchanger. The milk precipitated at a pH of 5.10.

EXAMPLE XVIII

To one quart low fat milk (pH 6.6) at 75° F. was added several drops of antifoam to minimize foaming during vigorous agitation. One volume 75% phosphoric acid diluted with two volumes of water was added dropwise to the vigorously agitated milk in two increments:

| | |
|---|---|
| 3.0 ml | pH 5.76 |
| 2.5 ml | pH 5.27 |

The pH equilibrated to 5.36 after 15 minutes.

A 33 ⅓% w/w solution of sodium bisulfate was added dropwise in two increments to the vigorously agitated milk:

| | |
|---|---|
| 3.0 ml | pH 5.02 no precipitation |
| 2.0 ml | pH 4.86 no precipitation |

The pH equilibrated to 4.92 after 15 minutes.

To this milk was added 0.4 ml Vitex® Cottage Cheese Coagulator and the milk allowed to set in a quiescent state:

| | | | | |
|---|---|---|---|---|
| 1.0 hour | 2.0 g | gel strength | pH 4.96 | 78° F. |
| 1.5 hours | 6.0 g | gel strength | pH 4.96 | 78° F. |
| 2.0 hours | 10.0 g | gel strength | pH 4.96 | 78° F. |

The coagulum was suitable for making cottage cheese.

While the invention has been described with reference to certain specific embodiments thereof, it is understood that it is not to be so limited since alterations and changes may be made therein which are within the full and intended scope of the appended claims.

What is claimed is:

1. An acid cheese curd making process comprising:
   A. adding from about 0.1 to about 0.8 parts by weight of acid salt and from about 0.01 parts to about 0.05 parts by weight of proteolytic enzyme per 100 parts by weight of acidified milk to an acidified milk having a pH of from about 4.8 to about 5.5 without coagulation at a temperature of from about 75° F. to about 95° F.; and thereafter
   B. allowing the acidified milk from (A) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

2. The process of claim 1 wherein the acid salt is sodium bisulfate.

3. An acid cheese curd making process comprising:
   A. adding from about 0.1 to about 0.8 parts by weight of acid salt as acidogen and from about 0.01 to about 0.05 parts by weight of proteolytic enzyme per 100 parts by weight of acidified milk at about 75° F. to about 95° F., the acidified milk having been acidified with food grade free acid to a pH of about 4.8 to about 5.5 without coagulation; and thereafter
   B. allowing the acidified milk from (A) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

4. The process of claim 3 wherein the acid salt is sodium bisulfate and the food grade free acid is phosphoric acid.

5. An acid cheese curd making process comprising:

A. acidifying milk under vigorous agitation at about 32° F. to about 95° F. with a sufficient amount of an acid salt per 100 parts by weight of milk to obtain an acidified milk having a pH of from about 4.8 to about 5.5 without coagulation; then
B. adjusting the acidified milk to a temperature of from about 75° F. to about 95° F.; then
C. maintaining the acidified milk at a temperature of from about 75° F. to about 95° F. and adding an acidogen and from about 0.01 parts to about 0.05 parts by weight of proteolytic enzyme per 100 parts by weight of the acidified milk; and thereafter
D. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

6. The process of claim 5 wherein up to about 0.8 parts by weight of the acidogen per 100 parts by weight of acidified milk is added in step C.

7. The process of claim 5 wherein the acid salt in step A is selected from the group consisting of an acid salt of sulfuric acid, phosphoric acid and tartaric acid.

8. An acid cheese curd making process comprising:
A. acidifying milk under vigorous agitation at about 59° F. to about 95° F. with a sufficient amount of an acid salt per 100 parts by weight of milk to obtain an acidified milk having a pH of from about 4.8 to about 5.5 without coagulation; then
B. adjusting the acidified milk to a temperature of from about 75° F. to about 95° F.; then
C. maintaining the acidified milk at a temperature of from about 75° F. to about 95° F. and adding an acidogen and from about 0.01 parts to about 0.05 parts by weight of proteolytic enzyme per 100 parts by weight of the acidified milk; and thereafter
D. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

9. The process of claim 8 wherein the acid salt in step A is selected from the group consisting of an acid salt of sulfuric acid, phosphoric acid and tartaric acid.

10. The process of claim 8 wherein the acid salt in step A is selected from the group consisting of sodium bisulfate, ammonium bisulfate, monosodium phosphate and sodium bitartrate.

11. The process of claim 10 wherein the acid salt in step A is sodium bisulfate.

12. The process of claim 8 comprising adding from about 0.3 to about 0.7 parts by weight of sodium bisulfate per 100 parts by weight of milk in step A to obtain an acidified milk having a pH of from about 5.5 to about 4.8 without coagulation.

13. The process of claim 8 wherein up to about 0.8 parts by weight of the acidogen per 100 parts by weight of acidified milk is added in step C.

14. The process of claim 13 wherein the acidogen is D-glucono-delta-lactone.

15. The process of claim 13 wherein the acidogen is an acid salt selected from the group consisting of an acid salt of sulfuric acid, phosphoric acid and tartaric acid.

16. The process of claim 13 wherein the acidogen is an acid salt selected from the group consisting of sodium bisulfate, ammonium bisulfate, monosodium phosphate and sodium bitartrate.

17. The process of claim 16 wherein the acidogen is sodium acid sulfate.

18. A process according to claim 8 with the additional steps of:
E. cutting the acid cheese curd into cubes,
F. expressing whey from the curd,
G. cooking and stirring the curd for from about 30 minutes to about 90 minutes at a temperature of from about 100° F. to about 150° F., and
H. washing and draining the curd to obtain a cottage cheese curd.

19. A process according to claim 8 with the additional steps of:
E. breaking up the acid cheese curd, then
F. bagging the broken curd and expressing whey therefrom, and thereafter
G. hanging and draining the bagged curd for about 1 hour to help express further whey, to obtain a baker's cheese curd.

20. A process according to claim 8 with the additional steps of:
E. cutting the acid cheese curd into cubes,
F. cooking and stirring the curd until whey temperature reaches about 130° F. and then continuing cooking for about 15 minutes additionally,
G. cooling the curd to about 59° F.,
H. draining the curd overnight at about 45° F. to obtain a dry, soft curd, and
I. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of
(a) from about 5 to about 6 percent for the production of Neufchatel cheese, or
(b) from about 10.5 to about 11.5 percent for the production of cream cheese.

21. An acid cheese curd making process comprising:
A. acidifying milk under vigorous agitation at about 32° F. to about 55° F. with a sufficient amount of an acid salt per 100 parts by weight of milk to obtain an acidified milk having a pH of from about 4.8 to about 5.5 without coagulation; then
B. adjusting the acidified milk to a temperature of from about 75° F. to about 95° F.; then
C. maintaining the acidified milk at a temperature of from about 75° F. to about 95° F. and adding an acidogen and from about 0.01 parts to about 0.05 parts by weight of proteolytic enzyme per 100 parts by weight of the acidified milk; and thereafter
D. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

22. The process of claim 21 wherein the acid salt is selected from the group consisting of an acid salt of sulfuric acid, phosphoric acid and tartaric acid.

23. The process of claim 21 wherein the acid salt is selected from the group consisting of sodium bisulfate, ammonium bisulfate, monosodium phosphate and sodium bitartrate.

24. The process of claim 23 wherein the acid salt is sodium bisulfate.

25. The process of claim 21 comprising adding from about 0.3 to about 0.7 parts by weight of sodium bisulfate per 100 parts by weight of milk to obtain an acidified milk having a pH of from about 5.5 to about 4.8 without coagulation.

26. The process of claim 21 wherein up to about 0.8 parts by weight of the acidogen per 100 parts by weight of acidified milk is added in step C.

27. The process of claim 26 wherein the acidogen is D-glucono-delta-lactone.

28. The process of claim 26 wherein the acidogen is an acid salt selected from the group consisting of sodium bisulfate, ammonium bisulfate, monosodium phosphate and sodium bitartrate.

29. A process according to claim 21 with the additional steps of:
   E. cutting the acid cheese curd into cubes,
   F. expressing whey from the curd,
   G. cooking and stirring the curd for from about 30 minutes to about 90 minutes at a temperature of from about 100° F. to about 150° F., and
   H. washing and draining the curd to obtain a cottage cheese curd.

30. A process according to claim 21 with the additional steps of:
   E. breaking up the acid cheese curd,
   F. bagging the broken curd and expressing whey therefrom, and
   G. hanging and draining the bagged curd for about 1 hour to help express further whey, to obtain a baker's cheese curd.

31. A process according to claim 21 with the additional steps of:
   E. cutting the acid cheese curd into cubes,
   F. cooking and stirring the curd until whey temperature reaches about 130° F. and then continuing cooking for about 15 minutes additionally,
   G. cooling the curd to about 59° F.,
   H. draining the curd overnight at about 45° F. to obtain a dry, soft curd, and
   I. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of
      (a) from about 5 to about 6 percent for the production of Neufchatel cheese, or
      (b) from about 10.5 to about 11.5 percent for the production of cream cheese.

32. An acid cheese curd making process comprising:
   A. acidifying milk under vigorous agitation at about 32° F. to about 95° F. with a sufficient amount of a mixture containing a major portion of solid acid salt and a minor portion of solid acidogen other than the acid salt per 100 parts by weight of milk to obtain an acidified milk having a pH of from about 4.8 to about 5.5 without coagulation; then
   B. adjusting the acidified milk to a temperature of from about 75° F. to about 95° F.; then
   C. maintaining the acidified milk at a temperature of from about 75° F. to about 95° F. and adding from about 0.01 parts to about 0.05 parts by weight of proteolytic enzyme per 100 parts by weight of the acidified milk; and thereafter
   D. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

33. The process of claim 32 wherein the acid salt is sodium bisulfate and the acidogen is D-glucono-delta-lactone.

34. An acid cheese curd making process comprising:
   A. acidifying milk under vigorous agitation at about 85° F. to about 95° F. with about 0.3 to about 0.7 parts by weight of sodium bisulfate per 100 parts by weight of milk to obtain an acidified milk having a pH of from about 4.8 to about 5.5 without coagulation; then
   B. adjusting the acidified milk to a temperature of from about 75° F. to about 95° F.; then
   C. maintaining the acidified milk at a temperature of from about 75° F. to about 95° F. and adding an acidogen and from about 0.01 parts to about 0.05 parts by weight of proteolytic enzyme per 100 parts by weight of the acidified milk; and thereafter
   D. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

35. The process of claim 34 wherein the acidogen is D-glucono-delta-lactone.

* * * * *